United States Patent [19]

Lacuna et al.

[11] Patent Number: 5,363,950
[45] Date of Patent: Nov. 15, 1994

[54] LUMBER ORGANIZER

[75] Inventors: Ricardo F. Lacuna, Oregon City; Gaylan J. Curry, Estacada; Dale E. Campbell, Oregon City, all of Oreg.

[73] Assignee: U.S. Natural Resources, Inc., Vancouver, Wash.

[21] Appl. No.: 153,636

[22] Filed: Nov. 17, 1993

[51] Int. Cl.⁵ .............................................. B65G 47/24
[52] U.S. Cl. ................................... 198/382; 198/415; 198/443; 198/459; 198/451
[58] Field of Search ............... 198/459, 461, 415, 382, 198/396, 434, 443

[56] References Cited

U.S. PATENT DOCUMENTS

| | | | |
|---|---|---|---|
| 2,679,919 | 6/1954 | Koning | 198/459 X |
| 3,147,842 | 12/1967 | Rambo | 198/434 |
| 3,608,695 | 9/1971 | Hellstrom | 198/459 |
| 3,771,641 | 11/1973 | Jonsson et al. | 198/396 |
| 4,077,524 | 3/1978 | Rysti | 198/459 |
| 4,173,277 | 11/1979 | Zimmerman | 198/443 |
| 4,997,277 | 3/1991 | Suopajarvi et al. | 198/443 |
| 5,217,106 | 6/1993 | Bunney | 198/443 X |

FOREIGN PATENT DOCUMENTS

| | | | |
|---|---|---|---|
| 1224666 | 9/1966 | Germany | 198/461 |
| 1277127 | 9/1968 | Germany | 198/461 |
| 1481299 | 1/1969 | Germany | 198/443 |
| 2235536 | 1/1974 | Germany | 198/443 |
| 2937496 | 3/1980 | Germany | 198/443 |

*Primary Examiner*—H. Grant Skaggs
*Assistant Examiner*—Carol L. Druzbick
*Attorney, Agent, or Firm*—Robert L. Harrington

[57] ABSTRACT

A machine for aligning lumber received from a previous processing station into an orientation suited for a subsequent processing station. The machine has an infeed conveyor for receiving lumber from a previous processing station. Large rotating drums are positioned in the infeed conveyor adjacent to carriers of the infeed conveyor with a portion of the drum periphery extending above the infeed conveyor. An angled conveyor having multiple carriers, such as belts, is mounted strategic to the infeed conveyor and drums with the second conveyor extending upwardly at an angle to the infeed conveyor and drums. The drums are rotated such that the peripheral velocity of the drums is greater than the carriers of the infeed and angled conveyor. The drums elevate (lift) and accelerate the lumber from the infeed conveyor onto the angled conveyor. The infeed conveyor, the drums and the angled conveyor are cooperatively coupled to align the lumber in the desired orientation as the lumber is lifted and accelerated off the infeed conveyor and transferred to the angled conveyor. The angle of the angled conveyor may be adjusted to induce the lumber that may remain in a stacked condition as the lumber is transferred from the infeed conveyor to the angled conveyor to slide off one another to separate the pieces of lumber. An exit conveyor is provided adjacent the angled conveyor for transporting the aligned lumber to the subsequent processing station.

6 Claims, 3 Drawing Sheets

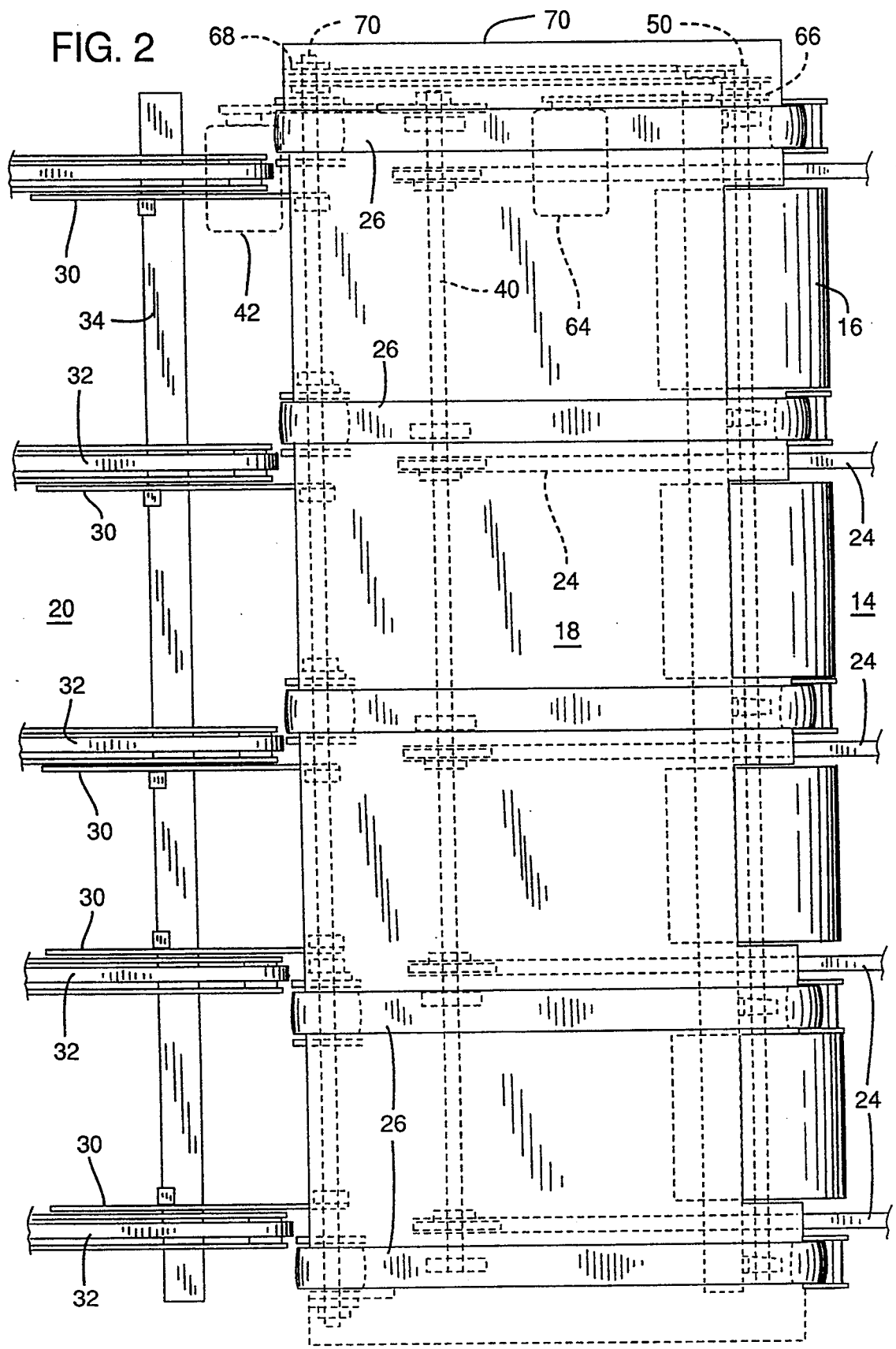

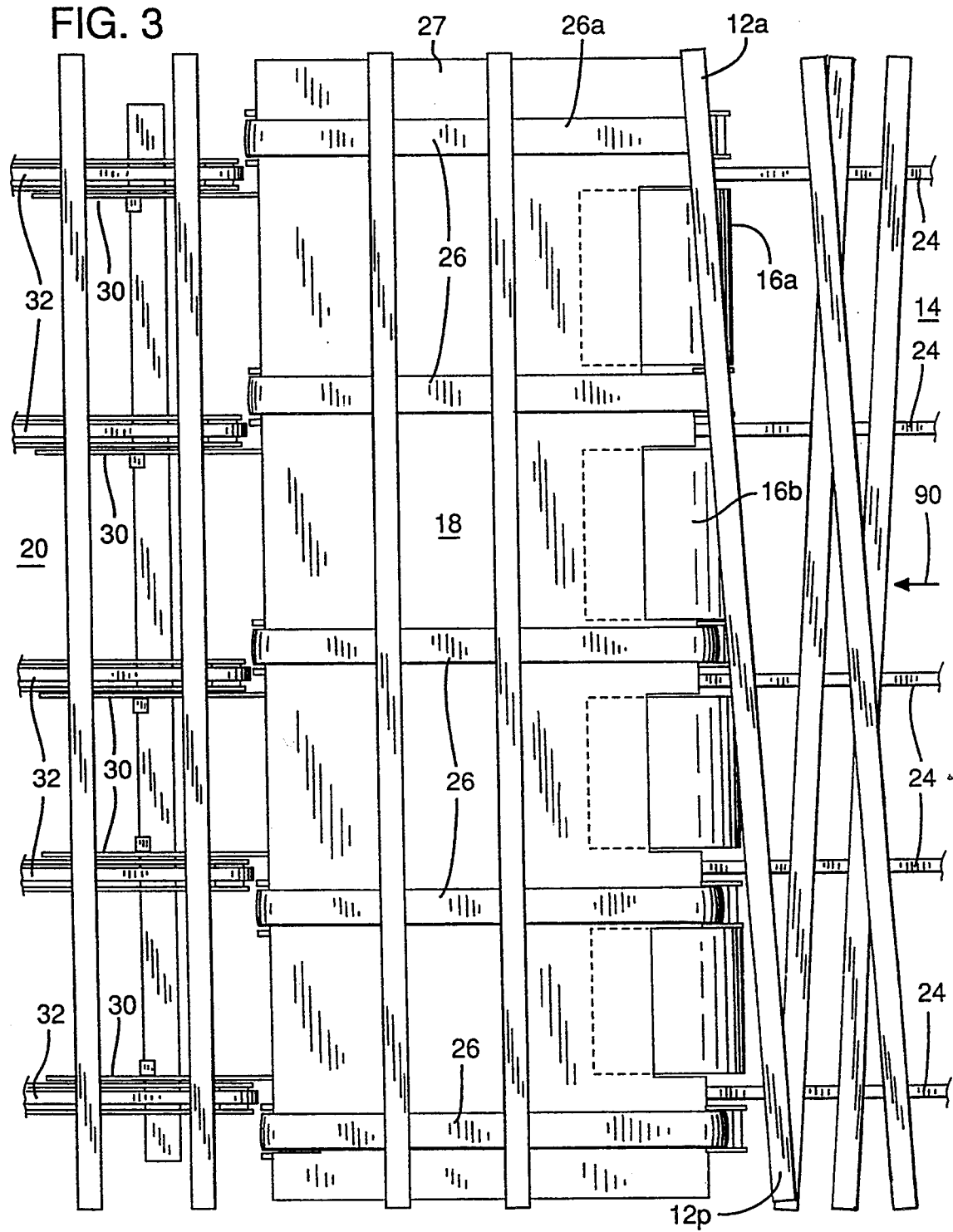

LUMBER ORGANIZER

FIELD OF THE INVENTION

This invention relates to a machine that orients lumber pieces collected together in a disarrayed arrangement into an organized arrangement, and more particularly to a machine which takes lumber pieces that are deposited haphazardly onto a conveyor and reorganizes those pieces during conveyance into a parallel relation.

BACKGROUND OF THE INVENTION

There are numerous operations that take place in a sawmill for converting logs to graded lumber. As the lumber pieces are formed out of the logs, they are conveyed from operation to operation, e.g., for trimming, edging, etc. It is important in the conveyance of the lumber pieces to properly orient those pieces when being directed into successive operations.

For a number of reasons, as the lumber pieces are being conveyed from one operation to the next, they become piled in a disarrayed arrangement. Before the lumber pieces can be efficiently processed in the next operation, the piled pieces must be reorganized (sometimes referred to as unscrambled). Machines known as unscramblers typically employ a V shaped trough or bin. The scrambled lumber pieces are dropped into the trough and as they bottom in the crease of the V they become aligned with the crease and, therefore, with each other. A conveyor with lifting bars pulls the pieces (supposedly sequentially) out of the trough bottom and the successive lumber pieces are thereby aligned, i.e., they retain the orientation of the crease in the bottom of the trough.

The problem with the unscramblers as described above is basically two-fold. The lifting bars of the conveyor need to be sized to the lumber being handled. If they are too small, they will not lift the larger pieces. If they are too big, they will lift out multiple smaller pieces which is also undesired. Also, the procedure of dropping the lumber into the trough and sequentially lifting them off of the bottom causes damage to the pieces. In the lift out procedure, when the trough contains a number of lumber pieces, because the bottom ones are being lifted out, the pieces piled on top are tumbled. Both the dropping of the pieces into the trough and the tumbling of the pieces by the lift out conveyor causes damage and reduces the value of the lumber.

BRIEF DESCRIPTION OF THE INVENTION

The present invention includes an infeed conveyor on which the lumber pieces are arranged in the disarrayed condition as explained, and an aligning member positioned near the end of the infeed conveyor (which replaces the trough), and an angled conveyor which conveys the realigned lumber pieces away from the aligning The preferred embodiment of the aligning member is a large diameter, elongated rotating drum (preferably provided as multiple aligned drum segments that cooperatively extend the width of the conveyor) having a high friction surface such as rubber. Only an upper portion of the drum surface is exposed to the incoming lumber pieces. That portion defines a curved upwardly directed moving surface that is engaged by the lumber pieces as they exit off of the infeed conveyor. It is the antithesis of the trough, i.e., it is an angled, moving wall that lifts the pieces rather than drops them as in the trough arrangement.

The drum portion leads to the upwardly angled conveyor and preferably forms an oblique angle with the angled conveyor. The angled conveyor is preferably a series of spaced apart belt segments having high friction surfaces supported on an angled plate, e.g., five inch width belts spaced at three foot intervals. The peripheral speed of the drum surface is faster than either the infeed conveyor or the angled conveyor. As the disoriented lumber pieces engage the drum surface, the drum accelerates the lumber pieces and moves them quickly up against the angled conveyor. Whereas the pieces may be carried over the drum at an angle, the leading end will engage the plate and then that end will wait at the top of the drum surface until the remainder of the lumber pieces catches up, i.e., until the lumber pieces lay flat against the angled conveyor. In that position, enough of the surfaces of the combined conveyor belts engage the lumber pieces so that the friction engagement will cause the lumber pieces to be carried up the conveyor.

The angle of the angled conveyor is adjustable to accommodate the different characteristics of different sizes of lumber pieces. The friction surface of the belt and the angle of the conveyor cooperate to cause the single lumber pieces to be gripped by the belts. That friction is greater than the friction between lumber pieces, e.g., piled one on top of the other. Thus, should lumber pieces be deposited one on top of the other, the angle setting is established to cause the stacked pieces to slide down the underlying pieces that are in direct contact with the conveyor.

There is a minimum of tumbling and no dropping of the pieces involved, and thus damage is substantially reduced. The frictional gripping in combination with the angular setting of the conveyor enables the apparatus to readily adapt to different sizes of lumber pieces.

The invention will be further understood and appreciated by reference to the following detailed description and drawings.

BRIEF DESCRIPTION OF THE DRAWINGS

FIG. 2 is a top view of the lumber organizing machine of FIG. 1; and,

FIG. 3 is a top view of the lumber organizing machine similar to FIG. 2 but illustrating the machine in operation.

DESCRIPTION OF THE PREFERRED EMBODIMENT

Figure 1:
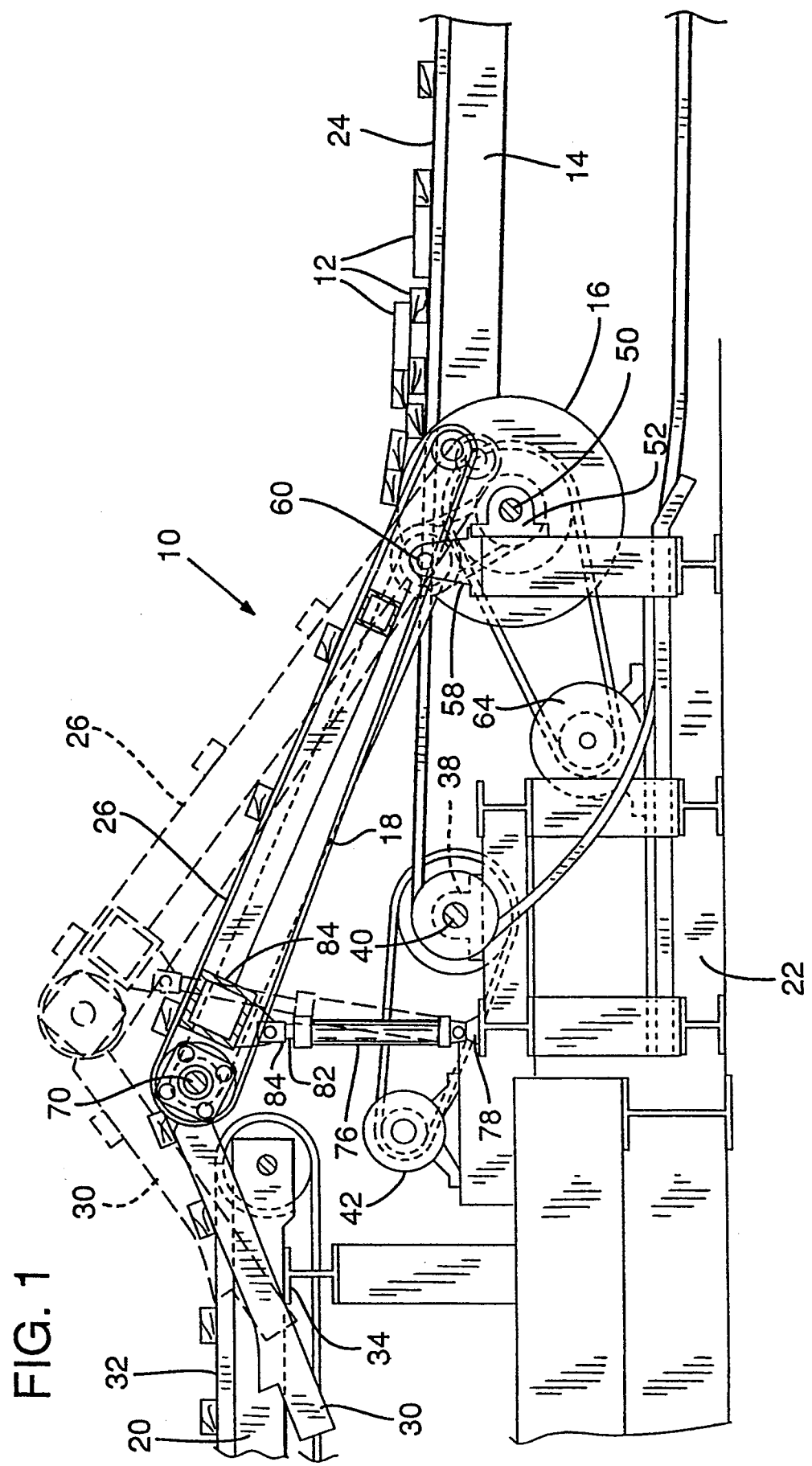
FIG. 1 is a side view of a lumber organizing machine of the present invention.

Refer now to FIG. 1 of the drawings which illustrates an aligning machine 10 of the present invention for aligning wood products such as pieces of lumber 12. The machine 10 is a conveyor system for conveying lumber pieces received from a previous processing station and aligning the lumber pieces 12 in an arrangement suited for a subsequent processing station. The processing stations are not illustrated since they are not the subject of the present invention. The machine 10 has an infeed conveyor 14 for conveying lumber from a previous processing station, drum (comprised of drum segments 16a, 16b) positioned at the exit end of the infeed conveyor 14, an angled conveyor 18 positioned strategic to and inclined upwardly from drum 16 and an exit conveyor 20 positioned to receive lumber 12 from the angled conveyor 18. Only the exit end of the conveyor 14 and the entry end of the conveyor 20 are illustrated in the drawings since they are of known construction. As shown in FIG. 1, the exit end of infeed conveyor 14, the drum 16, the angled conveyor 18 and the entry end of the exit conveyor 20 are all mounted on a common base 22.

Referring also to FIG. 2, the infeed conveyor 14 has multiple carriers such as chains 24. A drum segment is positioned between adjacent carriers 24 of the conveyor 14. A portion of the peripheral surface of the drum extends above the chains 24 as shown in FIG. 1. The angled conveyor 18 has multiple carriers, such as belts 26, which are supported by a metal plate 27 (shown in FIGS. 2 and 3 only). As shown, the belts are arranged with a belt 26 being positioned between and alongside a chain 24 of the conveyor 14 and a drum segment of drum 16. The angled conveyor 18 has multiple slides 30 pivotally mounted at its exit end with the slides 30 extending onto the exit conveyor 20. The exit conveyor 20 has multiple carriers such as belts 32 and is positioned strategic to the angled conveyor 18.

Referring to FIG. 1, the exit end of conveyor 14 is supported on the base 22 on brackets 38. A shaft 40 fitting in the brackets 38 supports known sprockets 44 for supporting and driving the chains 24 in a conventional manner. The drum 16 is supported on a shaft 50 mounted in brackets 52 which are attached to the base 22. The angled conveyor is pivotally mounted on brackets 58 of the base 22 by a shaft 60. The brackets 58 are strategically mounted on the base 22 to position the angled conveyor 18 in relation to the drum 16 and the infeed conveyor 14 substantially as shown in FIGS. 1 and 2.

The angled conveyor 18 is pivoted about the shaft 60, the shaft 60 defining its pivotal axis, by a cylinder 76 pivotally mounted to the base 22 on a bracket 78. A cylinder rod 80 of cylinder 76 is pivotally attached to a bracket 82 of the frame 84 of the angled conveyor 18. The angle of inclination of the angled conveyor 18 may thus be altered by extension and retraction of the cylinder rod 80 of the cylinder 76. The angled conveyor 18 is shown in the lowered position in solid and is shown in the elevated position by dashed outline. The slides 30 of the conveyor 18 are pivotally mounted on shaft 70 and slidably engage a frame member 34 of the frame 22. The slides 30 will slidably adjust as the conveyor 18 is elevated and lowered as shown by the solid and dashed outline of the slides 30.

The conveyor 14 is driven by a drive motor 42. A variable drive motor 64 drives the drum 16 and the angled conveyor 18 is coupled to be driven by the rotation of the drum 16. A sprocket set, generally indicated by numeral 66 in FIG. 2, is mounted on the end of shaft 50 and is coupled to a sprocket set, generally indicated by numeral 68, mounted on shaft 70 to provide the proper drive ratio. The exit conveyor 20 is driven by another motor (out of view) in a conventional manner.

In this embodiment the carriers 24 of conveyor 14, the carriers 32 of conveyor 20 are driven at a rate to accommodate the requirements of the subsequent processing station. The carriers 26 of the conveyor 18 are preferably driven at a higher feed rate than the carrier 24 of the conveyor 14. The carriers 26 of the conveyor 18 are varied depending on the piece count and the cross section of the lumber being conveyed. The higher rate of travel of the conveyor 18 will assure that lumber pieces will be separated and sequentially fed onto the conveyor 20, particularly if the pieces are in a stacked condition on conveyor 14. The drum 16 is driven such that the velocity of the drum periphery is greater than the velocity of the carriers 24 of conveyor 14 and carriers 26 of conveyor 18. The carriers 24 of the conveyor 14 in this embodiment are chains but it will be appreciated that the carriers of conveyor 14 may be of other types such as belts. The surface of the drum 16 and the belts 26 are a material that has a relatively high coefficient of friction and in this embodiment, the coating is a vulcanized rubber-like material. The plates 27 which support belts 26 have relatively low coefficient of friction. The material coating the drum 16 is selected to provide a higher coefficient of friction as between a drum surface and a lumber piece than between two lumber pieces and similarly the composition of the belts 26 is selected to provide a higher coefficient of friction as between the belt and a lumber piece 12 than between two lumber pieces 12.

Operation

Refer now to FIG. 3 of the drawings which schematically illustrates the aligning machine 10 transporting pieces of lumber 12. The lumber 12 received on the conveyor 14 is in disarray, that is it is not received on the conveyor 14 in any semblance of order. It will be appreciated that the illustration given is for example only and that the lumber 12 may be received on the conveyor 14 in a multitude of arrangements. As illustrated the pieces of lumber 12 are not arranged in a systematic order and generally do not have their longitudinal axis (i.e., the axis along the length of the piece of lumber 12) normal to the direction of conveyance. The direction of conveyance is indicated by arrow 90 in FIG. 3.

The following explanation is in part based on assumptions and/or theory derived from observing the machine in operation.

The pieces of lumber 12 as they are conveyed on the infeed conveyor 14 will come into contact with one or more of the rotating drum segments of drum 16 depending on the orientation of the piece of lumber 12. The drum 16, which has a peripheral velocity greater than the velocity of the carriers 24 of the conveyor 14 will, upon adequate frictional contact with a piece of lumber 12, lift the piece of lumber off the infeed conveyor 14 and propel the lumber onto the angled conveyor 18. The higher rate of travel of the drum 16 will accelerate the lumber to propel the lumber at a higher rate of travel than that of the angled conveyor 18.

First consider a piece of lumber 12 being transported on the infeed conveyor 14 that has its longitudinal axis normal to the travel direction. The travel direction is indicated by arrow 90 in FIG. 3. As the lumber 12 is transported along conveyor 14 and becomes engaged with the drum 16, the drums will lift and propel the lumber 12 toward and onto the angled conveyor at an increased rate of travel. The lumber 12 will be transferred to the belts 26 of the angled conveyor 18 in an aligned condition and the angled conveyor will transport the lumber upwardly with the lumber exiting the angled conveyor and sliding down the slides 30 onto the exit conveyor 20. The exit conveyor will then transport the lumber 12 in the aligned condition to a subsequent processing station.

Next consider a piece of lumber 12 being transported on the infeed conveyor 14 in an out-of-alignment condition, that is the longitudinal axis of the lumber 12 is not normal to the travel direction. A piece of lumber 12 that does not have its longitudinal axis arranged normal to the travel direction, such as the piece of lumber designated as 12a in FIG. 3, will have an end portion come into contact with an end drum segment, designated as 16a, ahead of the balance of the lumber piece. Several things are believed to occur simultaneously or have near simultaneous occurrence. The end drum 16a that contacts the end portion of the piece of lumber 12a that is ahead or leading will attempt to lift the end portion off the conveyor 14 and accelerate the end portion of the piece of lumber 12a. The end drum 16a will however only be in point contact with the end portion of the piece of lumber 12a.

A member that is linear in length, such as lumber piece 12 and has its longitudinal axis in a non-parallel attitude with respect to the longitudinal axis of a cylindrical member, such as drum 16, will only have a single point of contact as between the linear member and the cylindrical member. The single point of contact as between the piece of lumber 12a and one of the drum segments 16 is not in itself sufficient to provide adequate frictional engagement to propel the total piece of lumber 12a. The point contact between the end portion of the lumber 12a and the drum segment 16a may however provide sufficient frictional engagement for the drum segment 16a to elevate and propel the end portion of the lumber 12a.

As the drum 16a elevates and propels the end portion of 12a, the lumber piece 12a will be pivoting about its point of contact at the opposite end. The point of contact or pivot point is designated as 12p. It will be appreciated that the pivot point 12p is actually a moving pivot since the carriers 24 of the infeed conveyor continue to transport the lumber 12a toward the drum 16. The end drum 16a will however only remain in contact with the lumber 12a for a short duration, that is for a few degrees of rotation of the drum 16a. The point of contact will be moving along the length of the lumber 12a toward the pivot point 12p and thus along the cylindrical surface of the drum 16a and subsequent drum 16. The contact point can be considered to be moving along a helical angle, the helical angle being defined by the angle between the rotational axis of the drum 16 and the longitudinal axis of the lumber 12a. As the contact point moves along the length of the lumber 12a to at least near the mid point of the lumber 12a, the frictional force must increase to maintain the pivoting movement of the lumber 12 about the pivot point 12p. This is determined from the simple expression of force times moment (lever) arm.

Thus, as the contact point moves along the length of the lumber 12a toward its center point, the more likely slippage between the drum and lumber will occur. When slippage occurs, the lumber will be pivoting about the contact point since the infeed conveyor continues to move the opposite end of the lumber toward the drum 16. This pivoting motion aids in bringing the longitudinal axis of the lumber into a near parallel arrangement with the rotational axis of the drum 16. As the longitudinal axis of the lumber and the rotational axis of the drums approach parallelism, the drum will have sufficient frictional contact to accelerate the lumber 12a toward and onto the angled conveyor 18.

The lumber 12a will tend to flex to aid in providing adequate frictional contact as the lumber 12a comes into near alignment with the rotational axis. The lumber 12a will be traveling on the drum 16 at a rate greater than the rate of the angled conveyor 18 and if the lumber is still out of alignment, an end portion of the lumber 12a will come in contact with an end belt 26a of the angled conveyor 18 or with stationary plate 27. The single end belt 26a, since it is traveling at a lesser rate acts somewhat like a brake to slow the end portion of the piece of lumber 12a. The piece of lumber 12a will in effect be pivoted on the end belt 26a and the piece of lumber 12a will become oriented in the desired attitude, that is with its longitudinal axis normal to the travel direction. The single end belt in contact with the end portion of the piece of lumber does not have sufficient frictional engagement to propel the piece of lumber by itself. As the lumber piece is pivoted, the balance of the belts will come into contact with the piece of lumber to transport the piece of lumber up the angled conveyor 18.

Should one or more pieces of lumber remained in a stacked condition as they are transported over the drum 16, the angle of the conveyor 18 will induce the lumber piece stacked on another to slide downward back onto the drum 16. Recall that the belts 26 are of a composition to provide a greater coefficient of friction between belt to lumber than between lumber to lumber. This coupled with the capability of adjusting the angle of inclination of the conveyor 18 will induce the piece of lumber stacked on another to slide down to the drum 16. The piece of lumber that has slid off will then become aligned on the angled conveyor 18 and will be transported by the belts of the conveyor 18. The pieces of lumber 12 aligned on the conveyor 18 will be elevated upward and discharged onto the exit conveyor 20 via the slides 30. The slides 30 provide a final assurance that the pieces of lumber 12 will be properly oriented. The slides 30, being inclined with respect to the exit conveyor 20 promote the acceleration of the lumber pieces 12 and once again as the lumber pieces engage the belts 32 of the exit conveyor 20 alignment of the lumber in the proper orientation will occur.

The infeed conveyor 14, the drum 16 and the angled conveyor 18 are cooperatively coupled in combination to simultaneously transfer the lumber from the infeed conveyor to the angled conveyor and align the lumber in an orientation suited for a subsequent processing station. In essence, the combination functions in a manner not totally unlike that of the common V trough. Whereas lumber pieces slide into the crease of the V trough where they are aligned normal to a lifting conveyor, the drum 16 performs a similar function through accelerated lifting of the lumber pieces to a juncture with the angled conveyor which like the crease of the V forces the pieces into the aligned position. The benefit of the latter approach however is dramatic reduction of damage to the lumber.

Numerous revisions and modifications will become apparent to those skilled in the art and the invention encompasses such revisions and modifications as determined by the accompanying claims.

What is claimed is:

1. A lumber aligning machine for aligning lumber into an orientation suited for a subsequent processing station, the lumber aligning machine comprising:

a first carrier, a drum, and a second carrier mounted sequentially and defining a path of conveyance;

said first carrier receiving lumber deposited thereon in a disarrayed arrangement and transporting the lumber at a determined rate of conveyance to the drum;

said drum having a circumferential surface surrounding an axis, said drum rotatably mounted for rotation about said axis with a portion of the drum surface extending above said first carrier and adapted to receive lumber from said first carrier;

said second carrier positioned at an angle inclined upwardly from said drum surface and positioned to receive lumber transferred to it from said drum surface and for transporting the lumber at a given rate of conveyance, said drum rotating at a rate whereby the surface speed of said drum surface is faster than the rate of conveyance of the first and second carriers whereby the lumber is engaged by the surface of the drum and carried at an accelerated rate to be deposited onto the angled second carrier so as to force alignment of the lumber.

2. A lumber aligning machine as defined in claim 1 including:

an adjusting mechanism for said second carrier for adjusting the angle of inclination of said second carrier.

3. A lumber aligning machine as defined in claim 2, wherein:

said second carrier is comprised of a carrier belt having a surface with a coefficient of friction relative to the lumber whereby adjustment of the angle of inclination can be made to achieve gripping contact between the belt and lumber and sliding contact between lumber and lumber.

4. A method of converting a disarrayed arrangement of lumber into an aligned arrangement for processing, said method comprising:

establishing a laterally directed first path of conveyance, a second path of conveyance intersecting said first path of conveyance and inclined at the point of intersection away from said first path of conveyance, and a third path of conveyance intersecting said second path of conveyance and inclined at the point of intersection away from said second path of conveyance;

conveying disarranged lumber along said first path of conveyance at a determined rate of conveyance to the point of intersection with said second path of conveyance;

conveying lumber along said second path of conveyance at a rate of conveyance that is greater than said determined rate of conveyance; and conveying the lumber along said third path of conveyance at a rate of conveyance that is less than the rate of conveyance along said second path of conveyance.

5. A method as defined in claim 4 including conveying the lumber along the third path of conveyance at said determined rate of conveyance.

6. A method as defined in claim 4 wherein the third path of conveyance is a conveyor belt having a planar surface with a coefficient of friction relative to the lumber that is greater than the coefficient of friction between lumber and lumber, and wherein said conveyor is provided with adjustment means for adjusting the angle thereof, said method further comprising adjusting the angle of the second conveyor whereby the lumber is gripped and conveyed by said conveyor while lumber piled on lumber slides off the underlying lumber.

* * * * *